United States Patent
Carlson et al.

(10) Patent No.: US 6,434,586 B1
(45) Date of Patent: Aug. 13, 2002

(54) NARROW WALLACE MULTIPLIER

(75) Inventors: David Albert Carlson, Hudson; Derek Scott Brasili, Fitchburg; Vishnu V. Yalala, Shrewsbury, all of MA (US)

(73) Assignee: Compaq Computer Corporation, Houston, TX (US)

( * ) Notice: Subject to any disclaimer, the term of this patent is extended or adjusted under 35 U.S.C. 154(b) by 0 days.

(21) Appl. No.: 09/240,419

(22) Filed: Jan. 29, 1999

(51) Int. Cl.$^7$ ................................................. G06F 7/52
(52) U.S. Cl. ...................... 708/625; 708/627; 708/632
(58) Field of Search ........................ 708/620, 625, 708/627, 628, 629, 630

(56) References Cited

U.S. PATENT DOCUMENTS

| | | | | |
|---|---|---|---|---|
| 4,809,212 A | * | 2/1989 | New et al. | 708/625 |
| 5,343,416 A | * | 8/1994 | Eisig et al. | 708/625 |
| 5,880,985 A | * | 3/1999 | Makineni et al. | 708/625 |

OTHER PUBLICATIONS

Israel Koren, *Computer Arithmetric Algorithms*, Prentice Hall, 1993, pp. 99–107.

Jalil Fadavi Ardekani, MXN Booth Encoded Multiplier Generator Using Optimized Wallace Trees IEEE Transactions On Very Large Scale Integration (VSLI) Systems, Jun., 1993, vol. 1, No. 2, pp. 120–125.

O.L. MacSorley, *High Speed Arithmetic in Binary Computers*, (Jan.,M 1961) pp. 67–91.

Andrew D. Booth, A Signed Binary Multiplication Technique Oxford University Press, 1951, Q.J. Mech. Appl. Math 4:236–240 (1951) pp. 100–103.

* cited by examiner

*Primary Examiner*—Chuong Dinh Ngo
(74) *Attorney, Agent, or Firm*—Cesari and McKenna, LLP

(57) ABSTRACT

A multiplier including a processor that generates at least one N by M array of partial products. The processor includes a first section that performs a first operation that generates an N by M array of partial products representing low order bits, and a second section that performs a second operation that generates an N by M array of partial products representing high order bits. The multiplier also includes a compressor that compresses the N by M array of partial products representing low order bits after the first operation and generates a plurality of carry bits that are utilized in the second operation. The multiplier further includes a memory for saving the plurality of carry bits generated by the compressor; a feedback mechanism that recirculates the plurality of carry bits obtained from the memory and utilizes the plurality of carry bits for calculations performed in the second operation; and an adder that separately sums the N by M array of partial products representing low order bits and the N by M array of partial products representing high order bits. In one embodiment, the multiplier includes a Wallace multiplier. The invention also relates to a method of electronically multiplying an N bit multiplicand by an M bit multiplier using a P bit Wallace multiplier.

11 Claims, 12 Drawing Sheets

NARROW WALLACE MULTIPLIER

FIELD OF THE INVENTION

Embodiments of the present invention are directed generally to methods and apparatuses for providing digital multiplication, and more specifically to methods and apparatuses that use Wallace multipliers. Embodiments of the invention relate to a multiplier partitioned into two sections wherein one section generates partial products that represent low order bits and a second section that generates partial products that represent high order bits.

BACKGROUND OF THE INVENTION

Many techniques for providing fast multiplication in various computer systems have been proposed. In general, these techniques are used for integer multiplication or for generating the mantissa in floating point multiplication. The following is a description of the prior art techniques that effect processing speeds in digital multipliers.

In the most basic case, the product of two N-bit binary operands (one a multiplicand, and the other a multiplier) is obtained by using a sum of partial products wherein the partial products, representing an interim result, are obtained by separately multiplying each bit of the multiplier by all the bits in the multiplicand and repeating this step with the next most significant bit of the multiplier until each bit in the multiplier has been used. As each partial product is obtained, it is offset by one bit to the left from the preceding partial product, and then the partial products as a whole are summed. The resulting summation of partial products generates the final product. This summation of partial products technique is typically referred to as long-hand multiplication. The technique is slow and requires the use of several internal registers in a computer system to perform the arithmetic.

As a result, most digital multipliers in a computer system typically add only two partial products at a time, and each partial sum is then added to the sum of the previous partial products. Such a technique reduces process time and memory allocation. However, in creating fast digital multipliers more efficient techniques like Booth's algorithm or Wallace trees may be employed. The use of Booth's algorithm allows a fast digital multiplier to reduce the number of partial products by using a method of recoding or encoding one of the operands (e.g., the multiplier). Essentially, by using Booth recoding, one is able to accelerate the addition and the formation of partial products.

Booth's algorithm (also referred to as modified Booth recoding) essentially recodes a multiplier in order to effectively reduce the number of partial products. By reducing the number of required partial products and the associated additions, the speed of performing a multiplication operation may be increased by a factor of about two. The techniques of Booth's algorithm and/or modified Booth recoding are described in "A Signed Binary Multiplication Technique" by Andrew Booth, Q. J. Mech. Appl. Math. 4:236–240 (1951); and a "Booth Encoded Multiplier Generator Using Optimized Wallace Trees", by Fadavi-Ardekani, J., IEEE Trans. on VLSI Systems 1(2), p120–125 (1993) which are incorporated herein by reference.

Fast multipliers that use Wallace trees to speed up the summation of partial products are well known. In these fast multipliers, a Wallace tree is used to perform the summation of partial products in a multiplication process. FIG. 1 shows a Wallace tree 43 that includes seven levels of full adders or carry save adders (CSA's numbering one through eighteen), plus a carry propagate adder 41. In a Wallace tree, a full adder or CSA takes three one-bit binary numbers, and generates one two-bit binary number. The two-bit binary number may either be used as an input to another CSA or used to represent the sum of previous inputs. In order to generate the first layer of the tree, the partial products are separated into columns, and bits with the same weighting average are grouped together (i.e., 1's, 2's, 4's, etc). Next, the columns are divided into threes. Each group of three bits is fed to a full adder, which creates a two bit output. The output from the first layer of the tree represents the same sum as the partial product, however, there are only two-thirds as many bits.

The remaining layers of the Wallace tree are generated by repeating the same process described for building the first layer by separating the bits into columns of equal weight, separating the columns into groups of three bits, and summing them with full adders. This results in an even smaller group of bits. Layers are repeatedly added until each layer reduces the number of bits to two bits per column, at which point two rows of bits are added with the carry propagate adder 41. By using a Wallace tree method, computer processing time may be reduced from being directly proportional to N (the number of bits) to having a $\log_{3/2} N$ proportionality. This process is discussed by C. S. Wallace in an article entitled "A Suggestion for a Fast Multiplier" in IEEE Transactions on Electronic Computers February (1964) which is incorporated herein by reference.

Referring to FIG. 1, an example of a Wallace multiplier 43 with twenty inputs labeled W1 to W39 is shown. The Wallace multiplier 43 includes eighteen three input adders forming seven levels of adders. The various inputs labeled W1 to W39 represent data inputs to the adders. Note that the outputs from each of the adders reduce three initial inputs to two outputs (3:2). The outputs are then provided as inputs to a succeeding adder. As an example, the inputs W3, W5, and W7 (collectively the "three summands") will be traced through the system. The three summands are inputs to a carry save adder 18 on level seven of the Wallace tree. The three summands are compressed into two outputs representing a sum (s) bit and a carry (c) bit. The sum (s) bits and carry (c) bits become inputs to a carry save adder 12 on level six of the Wallace tree 43. The carry save adder 12 receives a third input W9. Therefore, the carry save adder 12 has three inputs and compresses those inputs into two outputs, namely, another carry (c) and sum (s) bit.

The outputs from the carry save adder 12 become inputs to another carry save adder 8 on level five of the Wallace tree 43. In addition, the carry bit from a carry save adder 13 on level six of the Wallace tree 43 completes the third input for the carry save adder 8 on level five of the Wallace tree 43. The three inputs for the carry save adder 5 on level four of the Wallace tree 43 includes the carry bit and sum bit from the carry save adder 8 from level five of the Wallace tree 43, and the input W1. The three inputs of the carry save adder 5 on level four are compressed into two outputs, a sum bit and a carry bit. The two outputs from the carry save adder 5 become inputs to another carry save adder 3 located on level three of the Wallace tree. A third input for the carry save adder 3 is obtained from the carry bit of another carry save adder 6 on level four of the Wallace tree 43. The three inputs to the carry save adder 3 are compressed into two outputs, a carry bit and sum bit.

The sum bit and the carry bit from the carry save adder 3 are provided as inputs to different carry save adders. The sum bit from the carry save adder 3 is provided as an input to another carry save adder 2 located on level two of the Wallace tree. The remaining two inputs to the carry save adder 2 are obtained from the carry and sum bits of a carry save adder 4 located on level three of the Wallace tree. The carry bit of the carry save adder 3 located on level three of the Wallace tree is provided as an input to a carry save adder 1 located on level one of the Wallace tree. The remaining two inputs to the carry save adder 1 are the carry and sum bits obtained from a carry save adder 2 located on level two of the Wallace tree. Finally, the three inputs to the carry save adder 1 located on level one of the Wallace tree are compressed into a sum and carry bit. The sum (s) and carry (c) bits of the carry save adder 1 are inputs to a carry propagating adder 41 that produces a final sum.

The above algorithm is only a representative example of the types of combinations that might occur in a Wallace tree reduction. Note that this algorithm is repeated until the original twenty inputs are reduced to two final outputs that reach a carry propagate adder 41. The carry propagate adder 41, or full binary adder (FBA), provides the final sum in a time that is proportional to the logarithm of the number of inputs.

The Wallace multiplier 43 is substantially able to reduce summation time. In general, the Wallace multiplier 43 is comprised of a carry save adders (CSA) also known as 3:2 compressors. That is, the CSA receives 3 inputs and produces 2 outputs and all inputs have the same weight. The sum output has a weight of one and the carry output has a weight of two. For example, Table 1.0 shows the results of a 3:2 CSA. The CSA has three inputs (I1, I2, I3) and two outputs the sum (S) and a carry bit (C) with the appropriate weights assigned:

TABLE 1.0

A truth table consisting of the inputs for a 3:2 carry save adder in which the weights are also given to the sum (S) of the inputs (I1, I2, I3), and the carry bit (C).

| Weights: | | | 1 | 2 |
| --- | --- | --- | --- | --- |
| I1 | I2 | I3 | S | C |
| 0 | 0 | 0 | 0 | 0 |
| 0 | 0 | 1 | 1 | 0 |
| 0 | 1 | 0 | 1 | 0 |
| 0 | 1 | 1 | 0 | 1 |
| 1 | 0 | 0 | 1 | 0 |
| 1 | 0 | 1 | 0 | 1 |
| 1 | 1 | 0 | 0 | 1 |
| 1 | 1 | 1 | 1 | 1 |

The following example describes a binary operation using 3:2 CSA's which are organized hierarchically like a Wallace tree. Referring to FIG. 2A, the multiplicand is $110101011_2$ ($427_{10}$), and the multiplier is $110110011_2$ ($435_{10}$). In this instance, the 9-bit multiplicand is aligned vertically forming nine separate rows, and the multiplier is aligned horizontally. The multiplication procedure begins by multiplying the first bit of the multiplicand by the multiplier and entering the results starting in the leftmost bit position. The second bit of the multiplicand is then used to multiply each bit of the multiplier. The results are then entered onto the second row, however, the first bit is shifted to the right by one bit position. The succeeding rows are each similarly multiplied with the result being shifted to the right by one bit position. Alternatively, the multiplication may be performed by (1) rewriting the multiplier for each row that contains a bit equal to one in the multiplicand, (2) enter zeroes for each row that contains a bit equal to zero in the multiplicand; and (3) each successive row, excluding the first, should be shifted to the right by one bit position.

Again referring to FIG. 2A, the above procedure produces a parallelogram that is a 9-bit×17-bit array of partial products. Because 3:2 CSA's are being used, the inputs are rows of partial products that are combined into groupings of three. In this case, three input groups, each group consisting of three rows of partial products, are labeled 11 (one-one), 12 (one-two), and 13 (one-three). Because the carry bit output of the CSA's has a weight of two, the output is shifted one bit to the left. Referring to FIG. 2B, when group one-one is added, note that the summation of the three rows of partial products (including one row of zeroes not shown), produces both a sum and a carry. As stated, the sum and carry bits are stored in separate registers, and the results of sum 11 ($s_{11}$) and carry 11 ($c_{11}$) are shown. Referring to FIG. 2C and FIG. 2D, the summation of groups one-two and one-three are also shown. Group one-two produces sum12 ($S_{12}$), carry 12 ($c_{12}$), and group one-three produces sum13 ($S_{13}$) and carry 13 ($c_{13}$). In general, one CSA operation has reduced nine rows of partial products into six rows.

Referring to FIG. 2B–2D, the next step is to reduce the six rows of partial products into four rows. Therefore, another three inputs are provided to a CSA for compression. Referring to FIG. 2E, the compression is performed on sum11 ($s_{11}$), carry11 ($c_{11}$), and sum12 ($S_{12}$). These three inputs are provided as an input to one CSA, and carry12 ($c_{12}$), sum13 ($s_{13}$), and carry13 ($C_{13}$) are provided as the three inputs to another CSA. Referring to FIG. 2F, two CSA's are then used to produce four rows of partial products. The four rows of partial products are shown in FIG. 2F and FIG. 2G, as groups 21 (two-one) and 22 (two-two). Referring to FIG. 2F, group two-one contains sum21 and carry21, and shown in FIG. 2G, group two-two is composed of sum22 ($s_{22}$) and carry22 ($c_{22}$). The four rows are then compressed into two inputs. Specifically, three more inputs sum21 ($S_{21}$), carry21 ($c_{21}$), and sum22 ($s_{22}$) are forwarded to one more CSA and compressed into two rows of partial products. This compression produces sum31 ($S_{31}$) and carry31 ($c_{31}$) as shown in FIG. 2H. This output is then directed to a carry propagate adder along with carry22 ($C_{22}$). The three outputs sum31, carry31 and carry22 become inputs to another CSA and are compressed into two outputs sum41 ($S_{41}$) and carry41 ($c_{41}$). Referring to FIG. 2I, the two outputs, sum41 ($s_{41}$) and carry41 ($c_{41}$), are added together using a carry propagate adder 41 to produce the final product $101101010110010001_2$ ($185745_{10}$). Note that eight CSA operations were performed, however, because some operations were performed simultaneously, a time delay of only four CSA's was incurred.

Multipliers

Various hardware implementation schemes for multipliers may be used to perform the above described multiplication procedure of FIG. 2. FIG. 3 shows a schematic diagram of a classical multiplier 40 disclosed in the prior art that performs such a function. The multiplier 40 includes two 32-bit registers. A first register 42 stores a 32-bit multiplicand M, and a second register 44 holds a 32-bit multiplier Q. The second register 44 is a shift register for shifting the multiplier to the right as indicated by an arrow above the second register 44. The first register 42 and the second register 44 are electrically connected through an AND gate 46. The output from the AND gate 46 provides an input to a 32-bit adder 48. The 32-bit adder 48 provides an input to a 65-bit shift register 50 that holds the final product A. A feedback loop 52 is used to send carry bits back to the 32-bit adder 48.

The multiplier 40 operates in the following manner: a multiplicand M is loaded into the first register 42 and a multiplier Q is loaded into the second register 44. The multiplicand M is multiplied by the first significant bit of the multiplier Q. In doing so, a partial product A1 is generated. The partial product Al is forwarded to the 32-bit adder 48 and added to any previous partial products existing in the register 50. The result is stored in the 65-bit register 50. The multiplier Q is shifted 1-bit to the right in register 44 and the partial result Al in register 50 is shifted 1-bit to the left. Using the next most significant bit of multiplier Q in register 44 partial products Al through $A_N$ are obtained where the multiplier Q is N-bits wide. The process is repeated until each bit of the multiplicand M in register 42 is multiplied by each bit of the multiplier Q in register 44. The final product A, resulting from the N-partial sums, is stored in the 65-bit register 50. This classical approach to binary multiplication is neither fast nor efficient and the technique is typically not appropriate for a large array of numbers.

Referring to FIG. 4, another type of multiplier, a classical array multiplier 74 is shown. The array multiplier 74 is of the EV5/EV6 style (part numbers 21164 and 21264 respectively) which represents two generations of central processing (CPU) cores that implement a reduced instruction set computer architecture provided by Digital Equipment Corporation now Compaq Computer Corporation.

In the classical array multiplier 74 of FIG. 4, the multiplicand bits 78 (labeled M'pcand) are stationary and extends across the top of the array. Note that from left to right, the bits are entered in descending bit order, that is, from the most significant bit to the least significant bit. Further, the multiplier bits 79 (labeled M'plier) are entered vertically downwards into the array. Note that from top to bottom, the multiplier bits are entered in ascending bit order, that is, from the least significant bit to the most significant bit. In addition, at each intersection between the multiplier bits 79 and the multiplicand bits 78, there exists an AND gate (not shown) having the multiplier bit 79 and the multiplicand bit 78 as an input.

The array multiplier 74 is comprised of registers able to store both sum (s) bits and carry (c) bits. In the classical array multiplier 74, the carry bits (c) propagate vertically downwards while the summation bits propagate along the diagonal and to the right. This has the effect of making like product terms always appear on the diagonal. The low order bits appear incrementally from the side of the array and the high order bits appear simultaneously at the bottom of the array. Thus, because the products lie on a diagonal, it is very difficult to perform any column compression as occurs in a Wallace type compression. Therefore, another type of array multiplier able to implement a Wallace type compression is desired.

SUMMARY OF THE INVENTION

In multiplying large arrays of numbers, typical digital multipliers are slow, cumbersome, and are generally associated with excessive processing times. However, embodiments of the present invention overcome drawbacks of typical digital multipliers by creating a virtual multiplier by shifting the multiplicand as it traverses the array while the product terms remain stationary. In one embodiment of the present invention low and high order bit results are obtained separately, and Wallace compression is used in an array multiplier to reduce the number of carry save adders in the delay path, thereby, reducing computer processing time. Embodiments of the present invention take advantage of a system that separately requires the low and high order bits during a particular calculation. Specifically, the higher order bits of a product are calculated last or at a slower rate than the low order bits, and a processor may obtain the necessary low order bits first and await delivery of the higher order bits last.

Further, in embodiments of the invention both the low order results and high order results generated during an array multiplication procedure leave the array through the bottom of the array without routing the product terms through a control section. This procedure facilitates obtaining and providing, upon command, either the low order bits, or the high order bits for a particular calculation resulting in less area and wiring complexity. In addition, the product terms appear in the same bit position which allows for a Wallace type compression that further reduces computer processing time and the number of adders required.

In one aspect, the invention features a processor that generates at least one N by M array of partial products. The processor includes a first section that performs a first operation that generates an N by M array of partial products representing low order bits, and a second section that performs a second operation that generates an N by M array of partial products representing high order bits. The processor also includes a compressor that compresses the N by M array of partial products that represent the low order bits after the first operation, and generates carry bits that are utilized in the second operation.

The processor can include a memory for saving a plurality of carry bits generated by the compressor, and can also include a feedback mechanism that recirculates the plurality of carry bits obtained from the memory and utilizes the plurality of carry bits for calculations performed in the second operation. The processor can also include an adder that separately sums the N by M array of partial products that represents low order bits and the N by M array of partial products that represent high order bits.

In another aspect, the invention features a method for electronically multiplying an N bit multiplicand by an M bit multiplier using a P bit Wallace multiplier where N, M and P are integers. The method includes the steps of: providing an N bit multiplicand and an M bit multiplier, multiplying the N bit multiplicand and the M bit multiplier; and generating at least one N by M array of partial products using the P bit Wallace multiplier. The step of multiplying includes a step of performing a first pass using the P bit Wallace multiplier to generate an array representing low order bits. The step of performing the first pass comprises multiplying the N bit multiplicand and the M bit multiplier and generating an N by M array of partial products; performing a second pass using the P bit Wallace multiplier to generate an array representing high order bits wherein performing the second pass comprises multiplying the N bit multiplicand and the M bit multiplier, generating an N by M array of partial products and shifting the N bit multiplicand N bits to the left; and obtaining a first sum for the first set of partial products representing low order bits.

In one embodiment, the present invention relates to an integer digital multiplier used in a PCA-57 RISC microprocessor part number 21164PC. In this embodiment, the multiplicand is shifted as it traverses the array. The product terms remain stationary and because the carry bits are recycled, the present invention emulates having a 128-bit datapath width. Thus, the present invention allows a Wallace type multiplier to be used that has an N-bit datapath width where N represents the bit width of the operands. Thus, a computer programming instruction like Unsigned Quadword Multiply High (UMULH) for 64-bit wide operands is performed by cycling the partial products twice through a multiplier array.

The foregoing and other objects, aspects, features, and advantages of the invention will become more apparent from the following description and from the claims.

BRIEF DESCRIPTION OF THE DRAWINGS

In the drawings, like reference characters generally refer to the same parts throughout the different views. Also, the drawings are not necessarily to scale, emphasis instead generally being placed upon illustrating the principles of the invention.

Figures 2A, 2B, 2C, 2D:
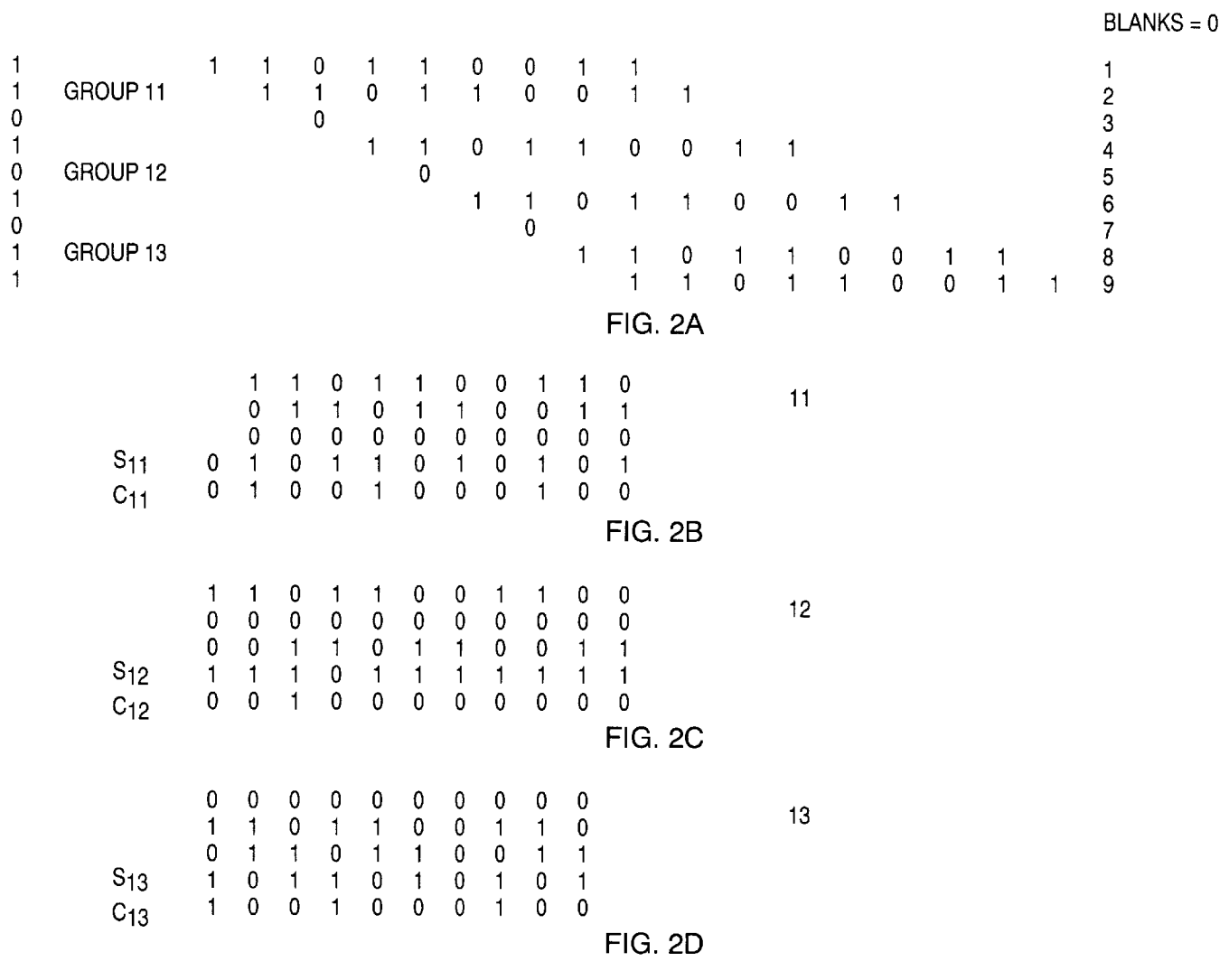
Figures 2E, 2F, 2G, 2H, 2I:
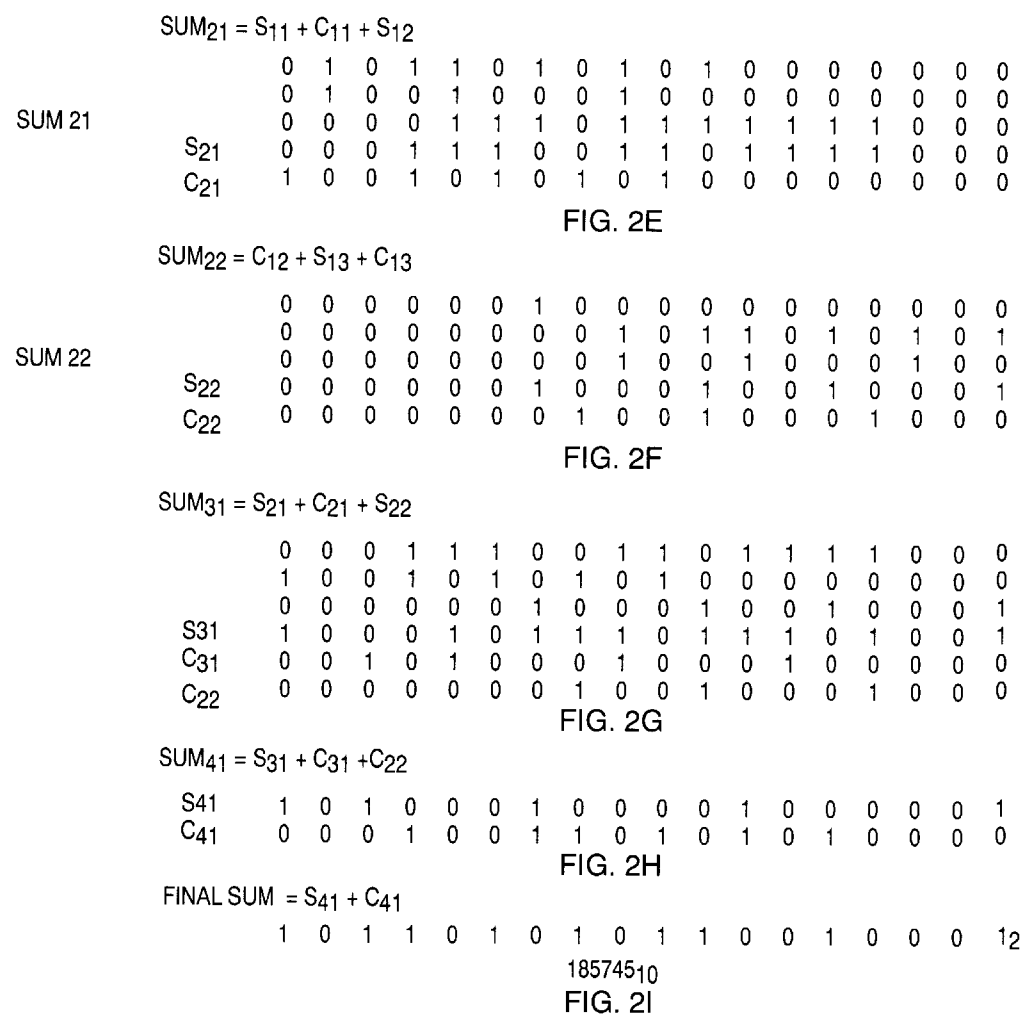

FIGS. 2A–2I provide a representation of a multiplication using hierarchical carry save adders.

DETAILED DESCRIPTION

Figure 5:
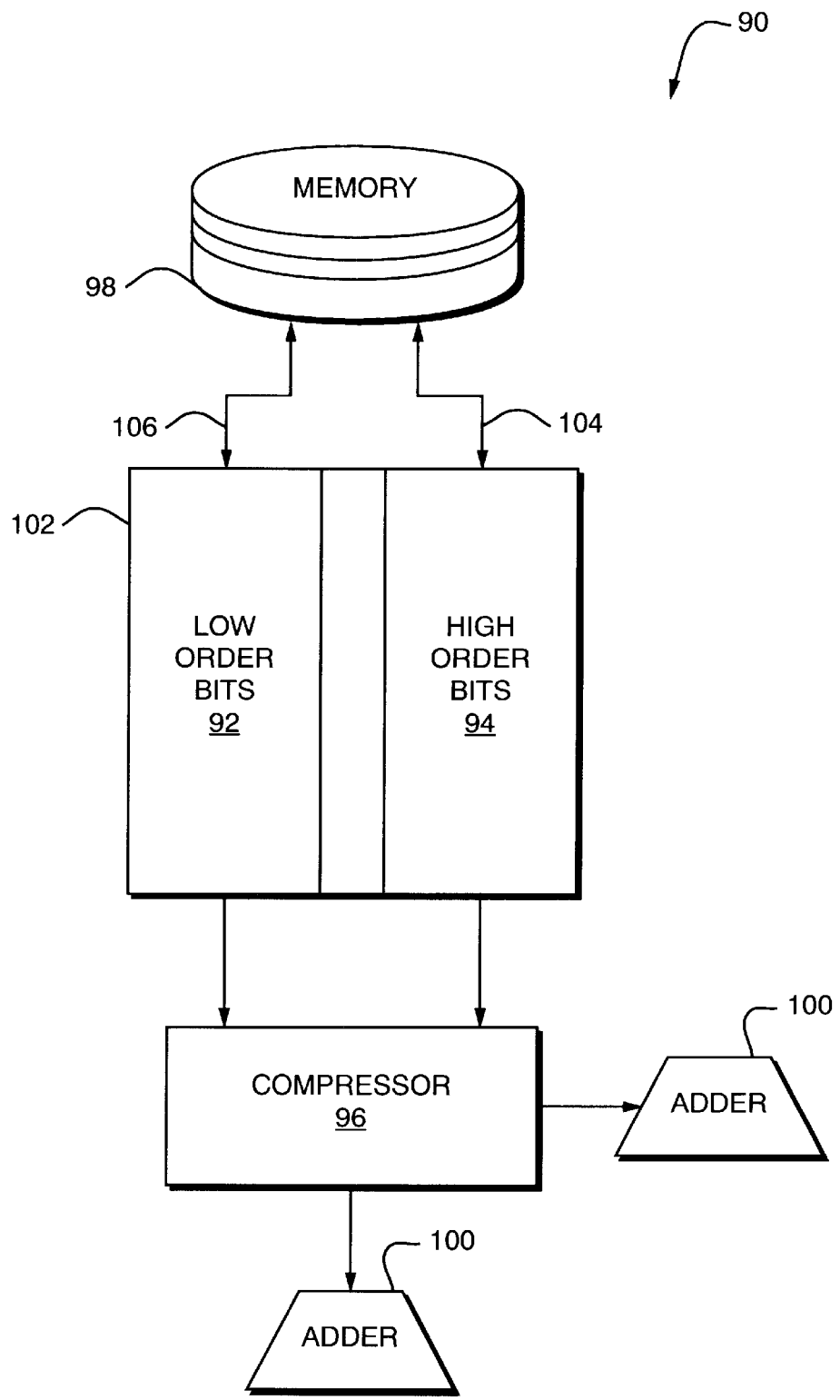
FIG. 5 is a schematic diagram of a narrow Wallace multiplier in accordance with one embodiment of the present invention.

Embodiments of the present invention are directed to digital multipliers that utilize a Wallace tree to reduce computer processing time. However, as understood by those skilled in the art the invention is not limited to multipliers using a Wallace tree. A block diagram for a narrow Wallace multiplier 90 in accordance with an embodiment of the present invention is shown in FIG. 5. The multiplier 90 includes a processor 102 that multiplies an N bit multiplicand by an M bit multiplier, and generates at least one N by M array of partial products. The processor 102 includes a first section 92 that performs a first operation that generates an N by M array of partial products representing low order bits. The processor 102 also includes a second section 94 that performs a second operation that generates an N by M array of partial products representing high order bits. The multiplier 90 also includes a compressor 96 that compresses the N by M array of partial products representing low order bits after the first operation and generates a plurality of carry bits that are utilized in the second operation.

The multiplier 90 also includes a memory 98 for saving the plurality of carry bits generated by the processor 102. A feedback mechanism (104, 106) recirculates the plurality of carry bits obtained from the memory 98 and utilizes the plurality of carry bits for calculations performed in the second operation. The compressor 96 is shown connected to two adders 100. The adders 100 separately sum the N by M array of partial products representing low order bits and the N by M array of partial products representing high order bits. In one embodiment of the invention, the two adders 100 are combined into a single adder having a partition which enables the adder to separately sum the high order bits and the low order bits.

A method in accordance with embodiments of the invention for using the multiplier 90 includes steps of providing an N bit multiplicand and an M bit multiplier:, multiplying the N bit multiplicand and the M bit multiplier and generating at least one N by M array of partial products. Note that although an N×M array is generated, an N×N array can be created by filling vacancies in the N×M array with zeroes. Further, the step of multiplying includes the steps of performing a first pass, as defined herein below, and using a P bit Wallace multiplier to generate an array representing low order bits where P is an integer. The step of performing the first pass includes multiplying the N bit multiplicand and the M bit multiplier and generating an N by M array of partial products where N and M are integers. In one embodiment of the invention, the integers M, N and P are equal.

The method also includes a step of performing a second pass using the P bit Wallace multiplier to generate an array representing high order bits. The step of performing the second pass includes multiplying the N bit multiplicand and the M bit multiplier, generating an N by M array of partial products and shifting the N bit multiplicand N bits to the left, and obtaining a first sum for the first set of partial products representing low order bits. Note that a "second pass" refers to generating an N by M array of partial products that represent the high order bits.

The method further includes steps of using the compressor 96 to perform a compression of the first set of partial products representing low order bits after executing the first pass, and recirculating carry bits generated from the compression by the compressor 96 of the first set of partial products representing low order bits into calculations performed on the second pass. The partial products may then be aligned into columns into any N by M array of partial products and a hierarchical compression of the partial products may be performed wherein the hierarchical compression includes a Wallace tree. In one embodiment, the compressor 96 that performs the compression is a series of 3:2 carry save adders that each compress three inputs into two outputs.

In one embodiment of the invention, the method also includes obtaining a second sum for a second set of partial products representing the high order bits. Note that the step of multiplying an N bit multiplicand and an M bit multiplier only utilizes N bits of datapath width. Although the product is 2N bits wide, the present invention uses a second, third or fourth pass, as needed, to generate the final 2N bit wide product. The method is discussed further below when describing operations in a PCA-57 RISC microprocessor.

The discussion utilizes a parallelogram 56 that represents the general shape of the partial product array generated after performing a binary multiplication using the multiplier 90.

Operation of The Narrow Wallace Multiplier 90

For integer multiplication, frequently only the low order bits of the product are required. For example, a 64-bit×64-bit multiplication produces a 128-bit product. However, often only the low order 64-bits are actually needed. Although the high order bits of the product are not always being used, they typically cannot be discarded and are retained because the high order bits contain information regarding the carry bits generated during the multiplication procedure. However, note that if an instruction only requires the low order bits, then the high order bits may be discarded.

In another embodiment of the invention, to reduce processing time, the higher order bits of the product may be calculated last or at a slower rate than the low order bits because of the parity of the operation. Thus, a processor may obtain the necessary low order bits first and await delivery of the higher order bits last.

In one embodiment of the invention, the multiplier 90 is used in a PCA-57 RISC microprocessor. For example, Digital Equipment Corporation (DIGITAL) now COMPAQ Computer Corporation, provides a PCA-57 multiplier. The PCA-57 multiplier produces an array that is sixteen partial products high by 64-bits wide, and forms a 16-bit×64-bit parallelogram. Because Booth recoding is used, the sixteen partial products are generated from 32-bits of the multiplier.

As is well known in the art, during a binary multiplication partial products are generated. In performing the steps of binary multiplication, each succeeding partial product is shifted by one bit either to the left or right. As a result, the shape of a parallelogram is created. In this case, the parallelogram for the PCA-57 is sixteen partial products high by 64-bits wide.

In this embodiment of the invention, the multiplier 90 is used to facilitate binary multiplications in the PCA-57 multiplier, or in multipliers similar to the PCA-57. The PCA-57 is associated with an instruction set that utilizes binary multiplication. The instruction set primarily comprises of three Assembly Language instructions for multiplying: Longword Multiply (MULL), Quadword Multiply (MULQ), and Unsigned Quadword Multiply High (UMULH). The MULL instruction computes the product of two signed 32-bit values and places the low 32-bit product of the multiplier and multiplicand in a destination register. The overflow in the destination register is not reported. The MULQ instruction computes the product of two signed 64-bit values. This instruction places the least significant 64-bit product of the multiplier and multiplicand in a destination register, and the overflow is not reported. The UMULH instruction computes the product of two unsigned 64-bit values. This instruction multiplies the multiplier and multiplicand and places the high-order 64-bits of the 128-bit product in a destination register.

Figure 6:
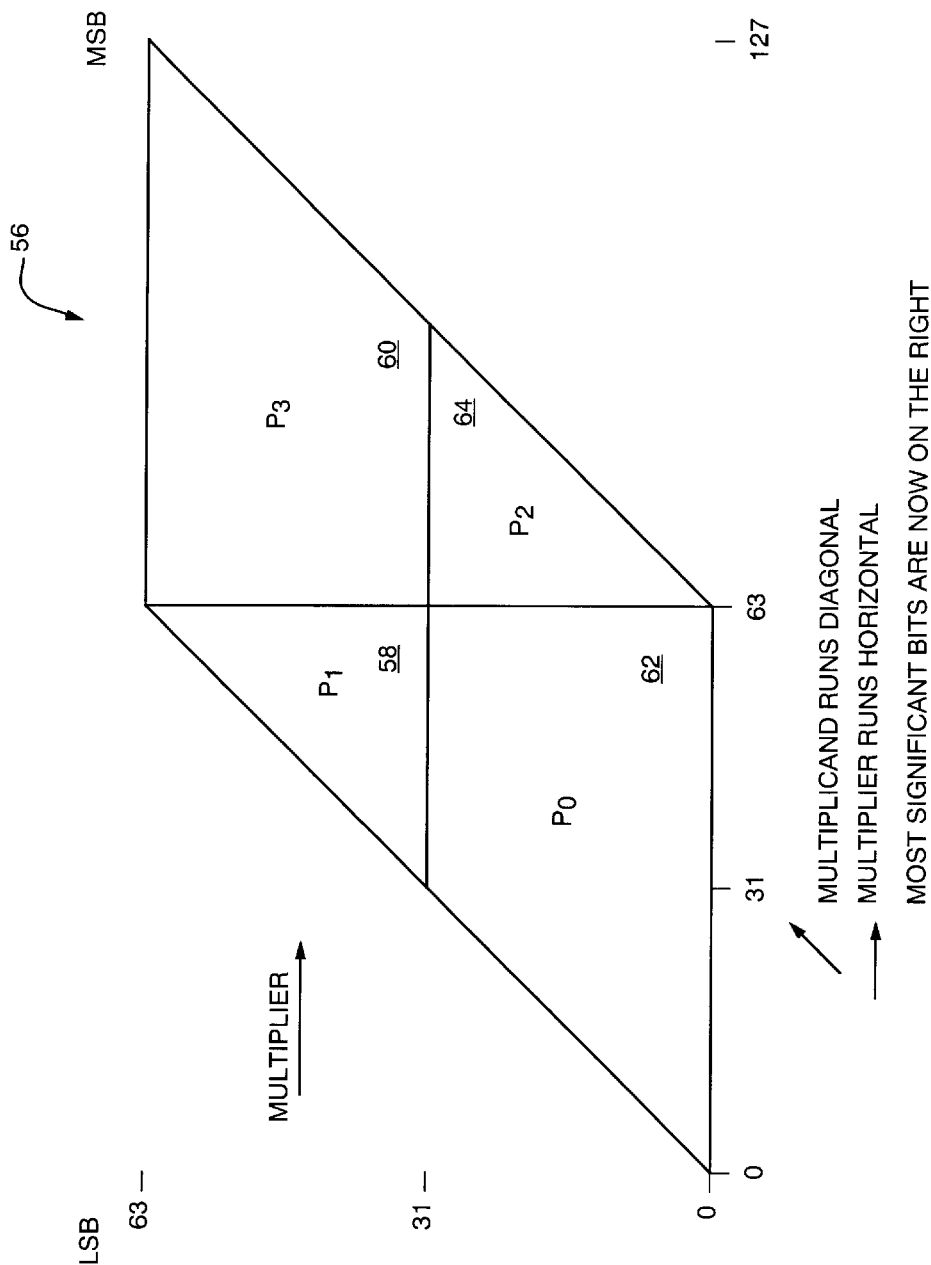
FIG. 6 is a schematic diagram of a parallelogram that depicts the number of passes required to obtain the product of a 64-bit×64-bit multiplication.

A parallelogram 56 is shown in FIG. 6 that represents the general shape of an array of partial products generated after performing a binary multiplication using the multiplier 90 of FIG. 5. The parallelogram 56 is divided into four quadrants 58, 60, 62, 64. Each quadrant contains a subset of the partial products, and the process of obtaining the partial products for each of the quadrants is referred to as a "pass". Therefore, the parallelogram 56 contains the partial products for four passes. The parallelogram 56 is used to describe several operations of the array multiplier 90 hereinbelow.

Figure 7:
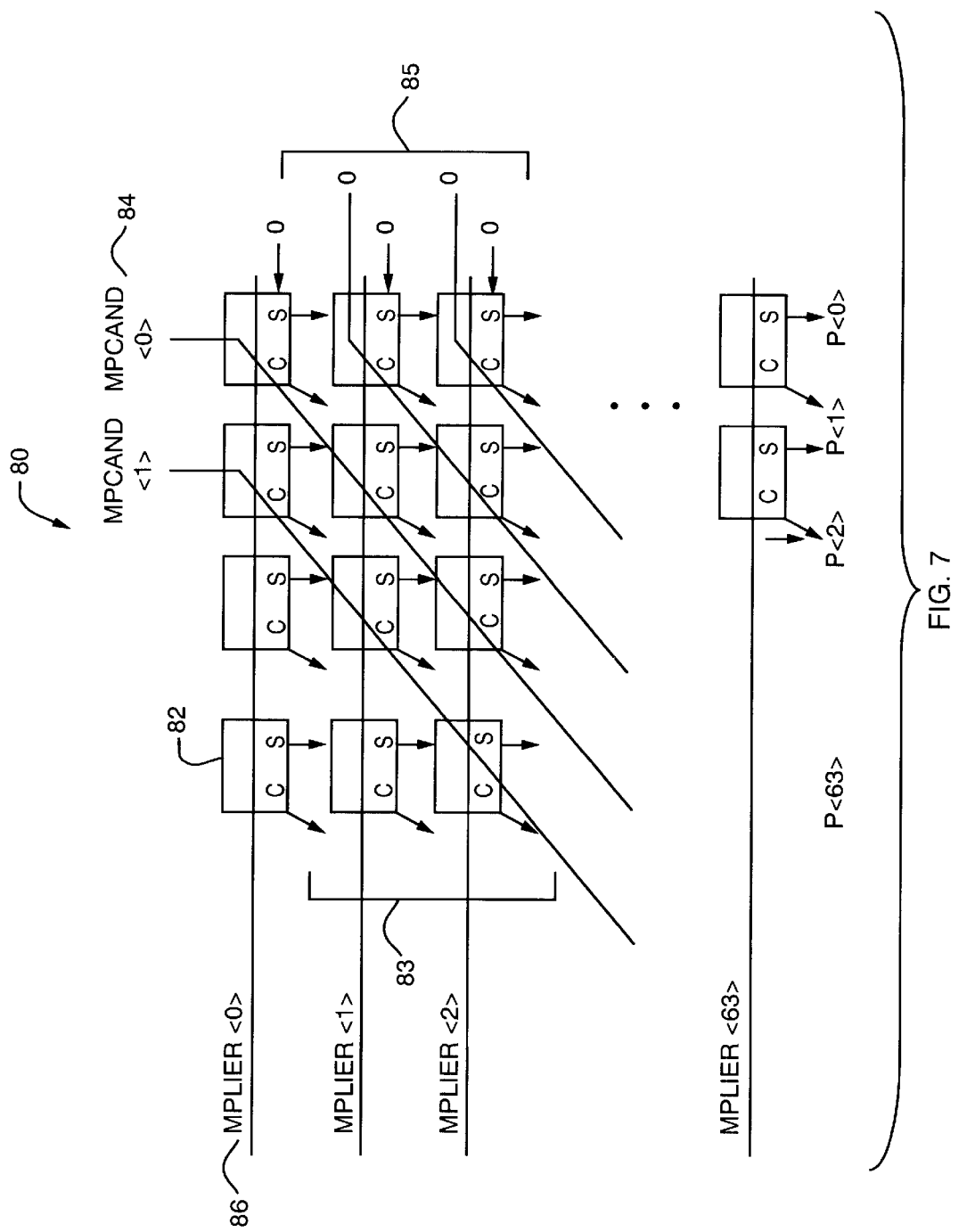
FIG. 7 is a schematic diagram of an operation in a PCA-57 multiplier.

An operation 80 of the array multiplier 90 is shown in FIG. 7. In the operation 80 shown, the multiplicand bits 84 are entered across the top of the array from left to right in descending bit order from the most significant bit to the least significant bit. The multiplier bits 86 are entered vertically downwards along the side of the array. The multiplier bits 86 are entered in ascending bit order, that is, from the least significant bit to the most significant bit. At each intersection between the multiplier bits 86 and the multiplicand bits 84, there exists an AND gate (not shown) having the multiplier bit 86 and the multiplicand bit 84 as an input. In one embodiment of the invention, the AND gates are replaced by a multiplexer to accomplish Booth recoding.

The array multiplier 80 may include registers able to store both sum and carry bits. However, unlike the classical array multiplier 74, the carry bits propagate along a transverse direction while the summation bits, representing the partial products, propagate vertically downwards. For example, in FIG. 7, the carry save adder 82 has the sum (s) output propagating vertically downwards, and the carry bit (c) propagating along a transverse direction through the multiplier array.

Referring to FIG. 7, the carries that fall off the left edge 83 are recycled back through the opposite side 85 of the array multiplier 80. This has the effect of making like product terms align in columns and appear in the same bit position, thereby making the terms compressible. As a result, a Wallace type compression may be used to reduce the overall number of carry save adders. Furthermore, both the low order bits and the high order bits appear at the bottom of the array. In one embodiment of the invention, the high and low order bits appear at the bottom of the array on separate passes. In addition, wrapping prior data back into the array in a pipelined manner is relatively easy. In this arrangement, the product terms remain stationary and because the carry bits are recycled, the present invention emulates having a 128-bit datapath. Thus, an instruction like unsigned quadword multiply high (UMULH) for 64-bit wide operands is performed by cycling the partial products twice through the array multiplier 80.

In addition to the multiplication instructions described above, the PCA-57 instruction set also includes two additional Assembler instructions, MULL/V and MULQ/V. The MULL/V instruction computes the product of two signed 32-bit values and places the 32-bit product of the multiplier and multiplicand in a destination register, and if an overflow occurs, an overflow exception is signaled. The MULQ/V instruction computes the product of two signed 64-bit values and places the 64-bit product of the multiplier and multiplicand in a destination register. If an overflow occurs, an overflow exception is signaled. The multiplication instruction set for the PCA-57 is summarized in Table 1.2 below:

TABLE 1.2

A portion of the multiplication instruction list in a PCA-57 RISC microprocessor provided by Digital Equipment Corporation.

| Instruction | Function | Result |
| --- | --- | --- |
| MULL | 32-bit × 32-bit | Low 32-bit |
| MULQ | 64-bit × 64-bit | Low 64-bit |
| MULL/V | 32-bit × 32-bit | Low 32-bit, Overflow |
| MULQ/V | 64-bit × 64-bit | Low 64-bit, Overflow |
| UMULH | 64-bit × 64-bit | High 64-bit |

An embodiment of the present invention relates to the MULL (Longword Multiply), MULQ (Quadword Multiply), and UMULH (Unsigned Quadword Multiply High) instructions in a PCA-57 RISC microprocessor. In a 32-bit by 32-bit multiplication, the MULL instruction requests only the low order 32-bits of a product. If bits 32 through 63 are zeroes, then the partial products reside in the left-hand quadrant of a 64-bit by 128-bit parallelogram. Referring to FIG. 6, the parallelogram 56 depicts the number of passes required to obtain the product of a 64-bit×64-bit multiplication that produces a 128-bit product.

Figure 8:
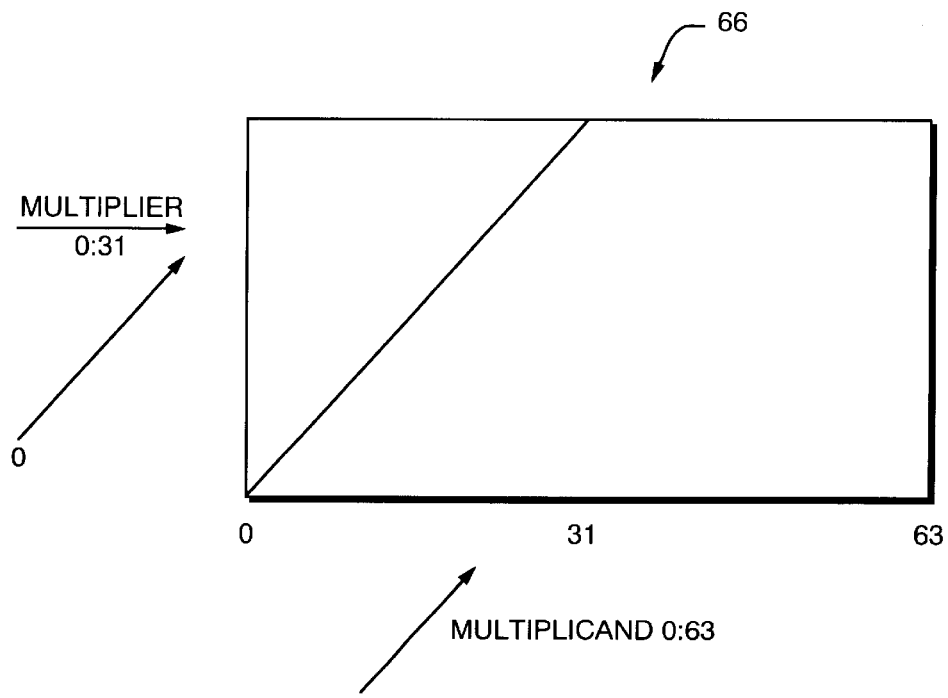
FIG. 8 is a schematic diagram of the relevant portion of a parallelogram that depicts the number of passes required to obtain the product of a Longword Multiply (MULL) instruction.

The parallelogram 56 is a hardwired multiplier array divided into four quadrants 58, 60, 62, 64 wherein each quadrant contains different portions of the product, and the process of obtaining the partial products in each of the quadrants is referred to as a "pass". The parallelogram 56 also represents a full 64-bit radix-4 Wallace multiplier. Note that in the parallelogram 56, the most significant bits (MSB) are located to the right and the least significant bits (LSB) are located on the left side of the parallelogram 56. Additionally, in the parallelogram 56, the multiplier runs horizontally and the multiplicand runs diagonally. Referring to FIG. 8, when the high order bits (32–63) of both the multiplicand and the multiplier are zero, the product resides only in the bottom left quadrant $P_0$ 62. Thus, if a MULL instruction is given, a multiplier array that is 32-bits×64-bits would yield the answer in a single pass since the least significant bits all reside in the lower left hand quadrant $P_0$ 62.

The parallelogram 56 shows thirty-two rows of partial products generated by a multiplicand that is shifted two bits every row. This results in a parallelogram of 32 rows of 64-bit numbers to be compressed. The shifting is done by the multiplicand to line up partial products results in a 128-bit wide multiplier. In embodiments of the invention due to area constraints, this "virtual" multiplier is not completely implemented to hardware. Rather, it is emulated by making several passes through a smaller multiplier array. This allows the design to fit into available space and retain most of the performance of the virtual multiplier.

To emulate the virtual multiplier, four passes are required. Complete emulation of the virtual machine is unnecessary for performance-critical 32-bit and 64-bit multiply instructions. For example, MULL only requires the lower 32-bits of the product available after the first pass. MULQ only requires the low 64-bit of the product which are available after the second pass. Only UMULH and MULQN/V require knowledge of the high 64-bits of the product requiring four passes.

Figure 9:
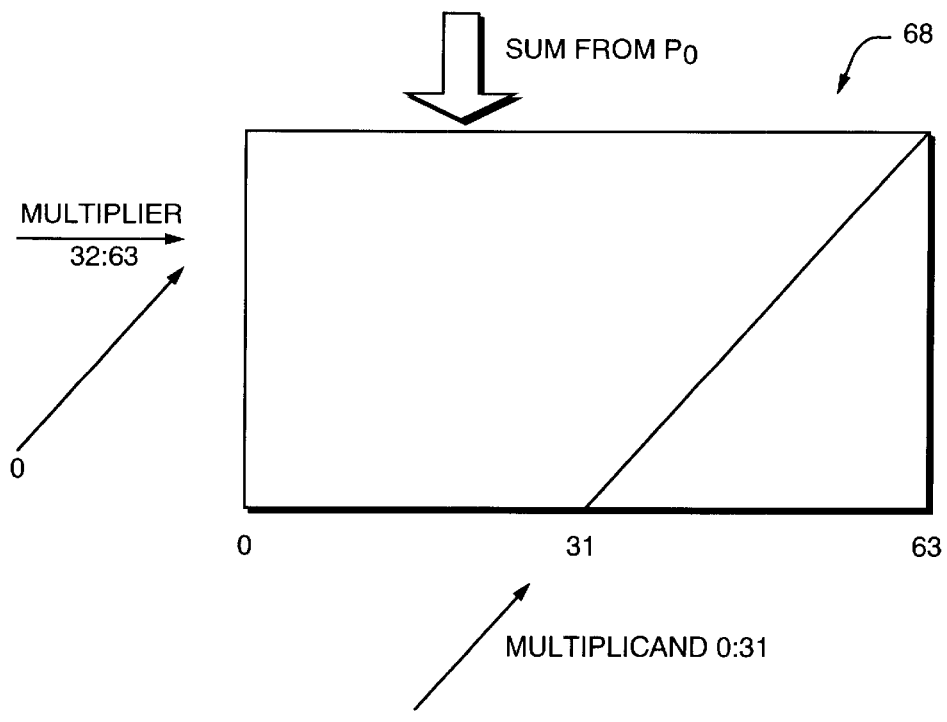
FIG. 9 is a schematic diagram of the relevant portion of a parallelogram that depicts the number of passes required to obtain the product of a Quadword Multiply (MULQ) instruction.

As stated above, the MULQ instruction provides the low 64-bits of a 64-bit by 64-bit multiplication, and for this instruction, two passes are required. Referring to FIG. 6, FIG. 8 and FIG. 9, note that quadrants $P_2$ 64 and $P_3$ 60 do not contribute to the low 64-bits of a product. For the MULQ instruction and referring to FIG. 6, only quadrants $P_1$ 58 and $P_0$ 62 will contribute. Therefore, only the partial products in quadrants $P_1$ 58 and $P_0$ 62 need to be computed. Thus, only two passes are required. In an embodiment of the invention where only two passes are required, the term "a first pass" generally includes multiplying an N bit multiplicand and an M bit multiplier and generating an N by M array of partial products representing low order bits. A "second pass" refers to generating an N by M array of partial products that represent the high order bits. The second pass includes multiplying a N bit multiplicand and a M bit multiplier, generating an N by M array of partial products representing high order bits and shifting the N bit multiplicand N bits to the left.

Referring to FIG. 8, the relevant portion of the parallelogram 56 is redrawn 66 for the MULQ instruction. The multiplier runs horizontally from 0:31 bits, and the multiplicand runs along the diagonal from 0:63 bits. In obtaining $P_0$ 62 (the first pass), the multiplicand runs from 0:63 and is electrically driven from the bottom of the array. The multiplicand inputs bits from the left edge. In this case the bits are zeroes. Thus, the bits that lie to the left of the diagonal are zero and cannot contribute to the product.

Referring to FIG. 9, the relevant portion 68 of the parallelogram 56 for the MULQ operation is shown. The multiplier runs horizontally from 32:63 bits, and the multiplicand runs along the diagonal from 0:31 bits. In obtaining $P_1$ 58 (the second pass), the high order 32-bits of the multiplier are used. The multiplicand is shifted to the right by 32-bits (note that this is a logical left shift) and the sum from $P_0$ 62 is added. Note that the bits that lie to the left of the diagonal are identically zero and will not contribute to the sum. Thus, the low order 64-bits of the product are provided, and the MULQ request for the low order bits in a 64-bit×64-bit multiplication is complete.

Figure 10:
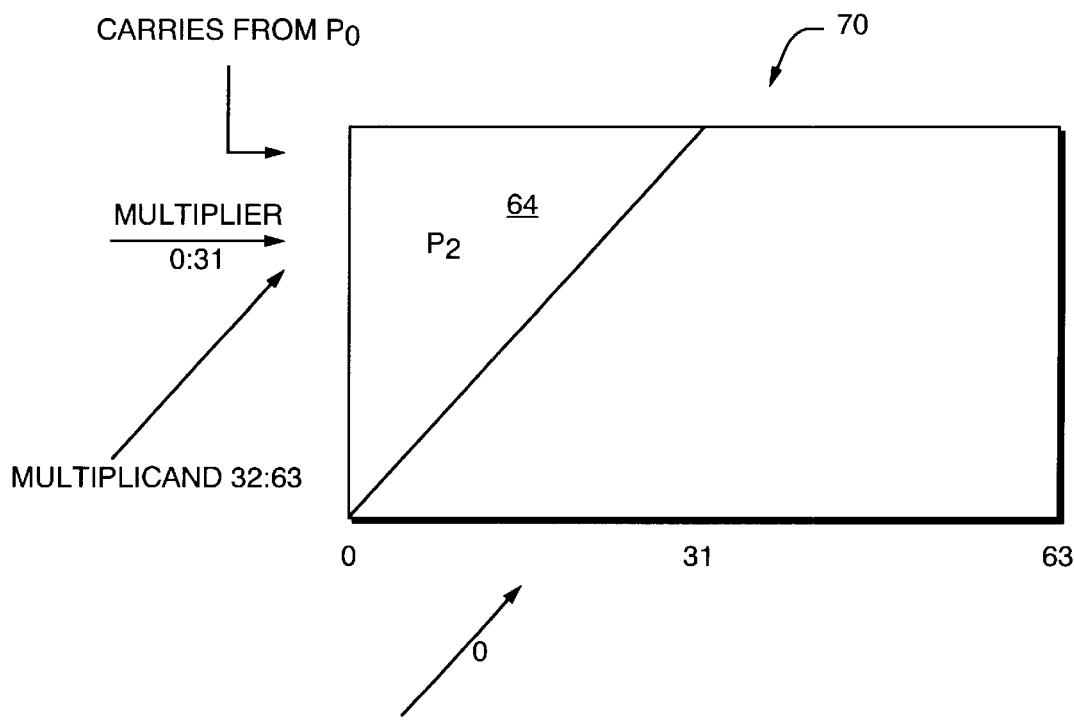
FIG. 10. is a schematic diagram of the first portion of a parallelogram that depicts the number of passes required to obtain the product of an Unsigned Quadword Multiply High (UMULH) instruction.

The UMULH instruction provides the high 64-bits of a 64-bit by 64-bit multiplication. In the PCA-57, this instruction is rarely used, therefore, processing time is not critical. Thus, a response to this instruction can be relatively slow. Although the UMULH instruction only seeks the high product bits $P_2$ 64 and $P_3$ 60, the low product bits may still be required. Therefore, this instruction would still require passes through quadrants $P_0$ 62 and $P_1$ 58 since the low order bits can contribute carries that would affect the final answer. In obtaining $P_2$ 64 and referring to FIG. 10, the relevant portion of the parallelogram 56 is redrawn 70 for the UMULH instruction. The multiplier runs horizontally from 0:31 bits, and the multiplicand runs along the diagonal from 32:63 bits. Noticeably, the multiplicand is shifted to the left by 64-bits. Logically, this is a right shift. As stated above, the carries generated by $P_0$ 62 are reintroduced into the left edge of the array. In this case, the sum from a previous pass is not added.

Figure 11:
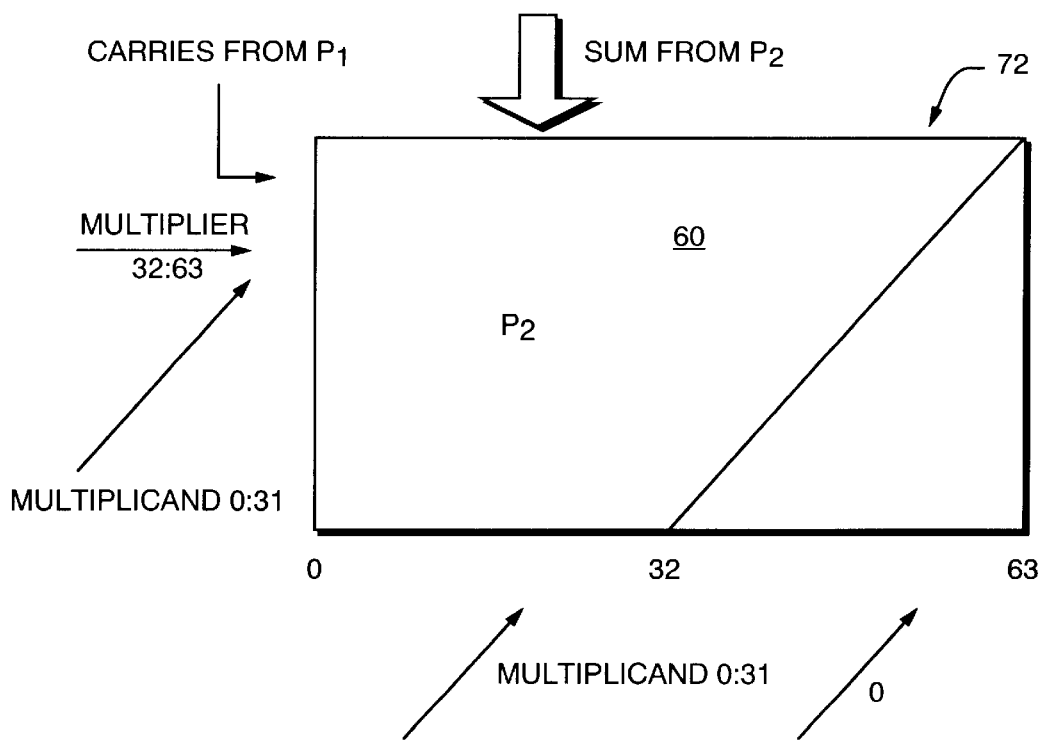
FIG. 11 is a schematic diagram of the second portion of a parallelogram that depicts the number of passes required to obtain the product of an Unsigned Quadword Multiply High (UMULH) instruction.

In obtaining $P_3$ 60 and referring to FIG. 11, the relevant portion of the parallelogram 56 is redrawn 72 for the UMULH instruction. In this case, the multiplier runs horizontally from 32:63 bits, and the multiplicand runs along the diagonal from 0:31 bits and 32:63 bits. Calculating $P_3$ 60 is much like the pass described above for obtaining $P_2$ 64. However, in this pass, the carries generated by $P_1$ 58 are reintroduced into the left edge of the array, and the sum from the previous pass $P_2$ 64 is added. Thus, the high order 64-bits of the product are provided, and the UMULH request for the high order bits in a 64-bit×64-bit multiplication is complete.

An Alternative Embodiment

Figure 12:
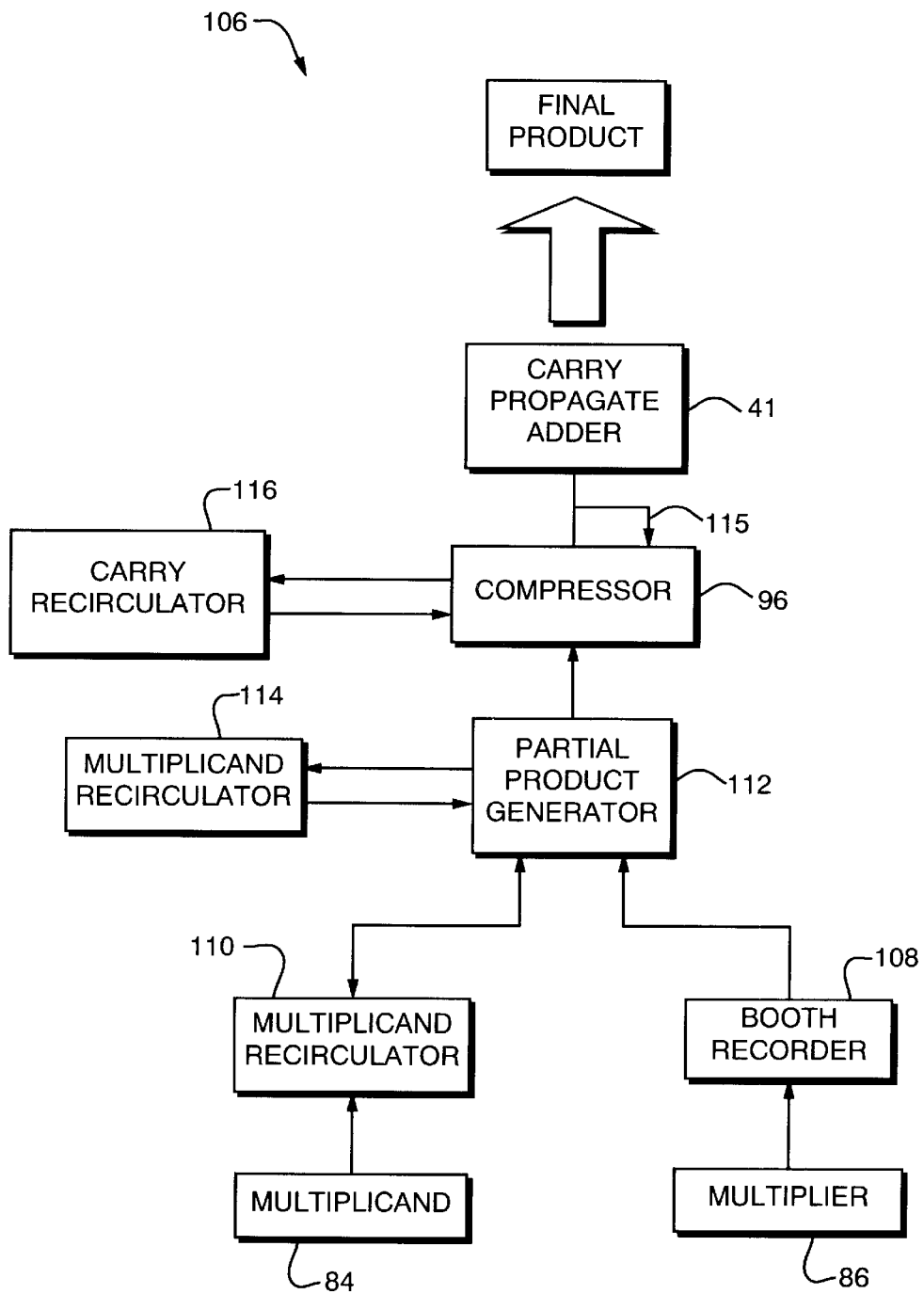
FIG. 12 is a schematic diagram of an alternate embodiment of a narrow Wallace multiplier of the present invention.

A block diagram of an alternative embodiment of an array multiplier 106 that implements features described herein is shown in FIG. 12. The array multiplier 106 is provided with a multiplicand 84 and a multiplier 86. The multiplier 86 and the multiplicand 84 are both 64-bits wide. The multiplier bits 86 are inputs to a recoder 108. In one embodiment, the recoder 108 is a 64-bit wide Booth recoder.

The multiplicand bits 84 are inputs to a multiplicand recirculator 110. The recoder 108 is electrically connected to a multiplicand recirculator 110. The multiplicand recirculator 110 is a feature that facilitates the virtual multiplier by wrapping the partial product array and allowing the inputs to be recirculated between passes. The multiplicand recirculator 110 and the recoder 108 are electrically connected to a partial product generator 112. In one embodiment, the operations of the partial product generator 112 is represented by the parallelogram 56 discussed earlier. The parallelogram 56 is a multiplier array divided into four quadrants wherein each quadrant contains different portions of the partial products, and obtaining the partial products in each of the quadrants is referred to as a "pass". Therefore, the parallelogram represents four passes.

The partial product generator 112 uses Booth recoding to generate the partial products. In one embodiment of the invention, the partial product generator 112 uses Radix-4 Booth recode to generate sixteen partial products. The sixteen partial products plus the final two carry save adder (CSA) outputs are fed into a compressor 96. Accordingly, the two carry save adder outputs become two extra inputs to the compressor 96. In one embodiment of the invention, the two extra inputs are the sum $P_0$ referred to in FIG. 9, or the sum from $P_2$ referred to in FIG. 11. The feedback loop 115 refers to the two extra inputs being recirculated back into the compressor 96. The two extra inputs are used to recirculate data for pass one and pass three. However, for pass zero and pass two, the two inputs are not needed and are forced to zero. As a result, for pass zero and pass two, the two extra inputs do not contribute to the total sum.

Figure 1:
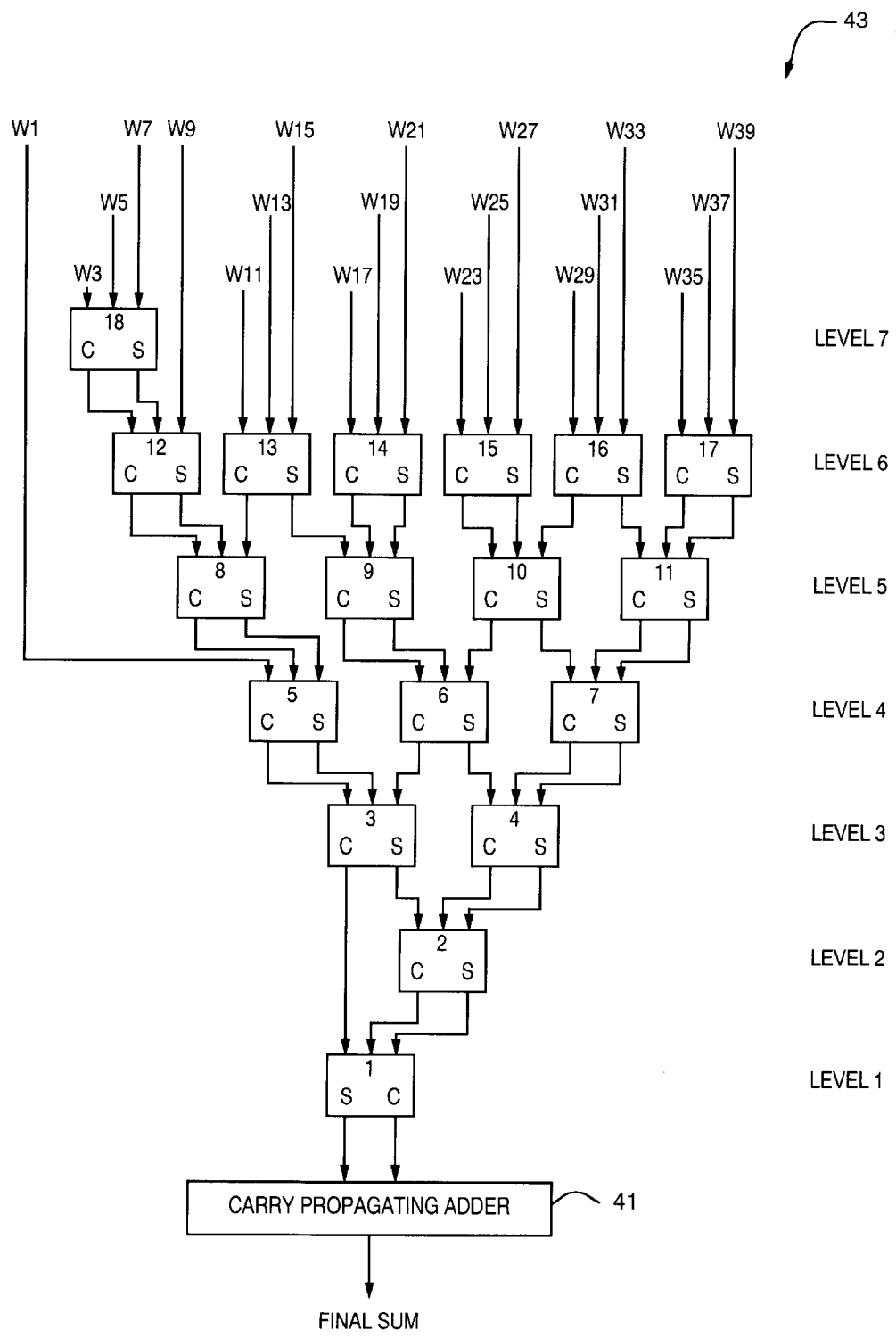
FIG. 1 is a schematic diagram of a Wallace tree multiplier.
Figure 3:
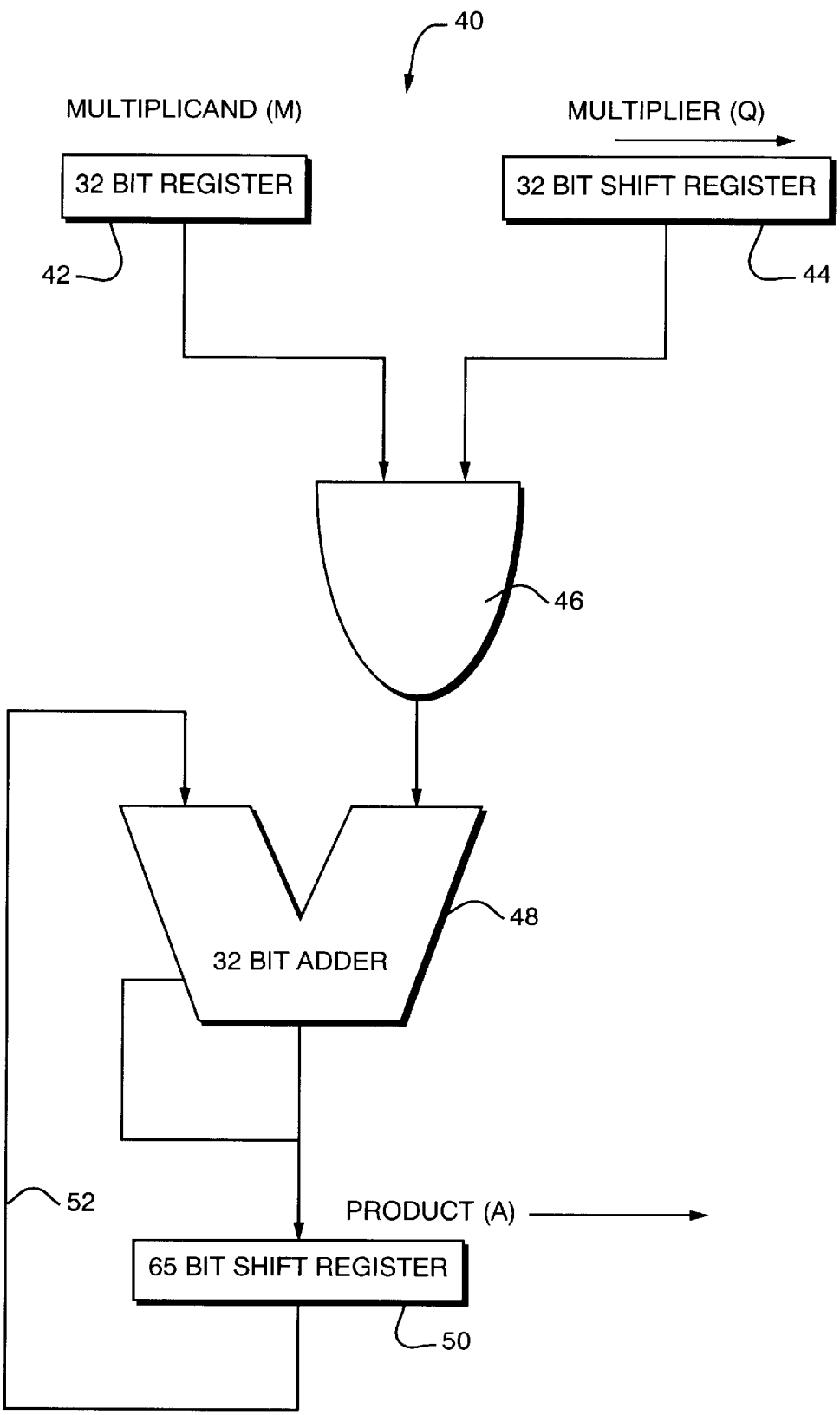
FIG. 3 is a schematic diagram of a classical multiplier disclosed in the prior art.
Figure 4:
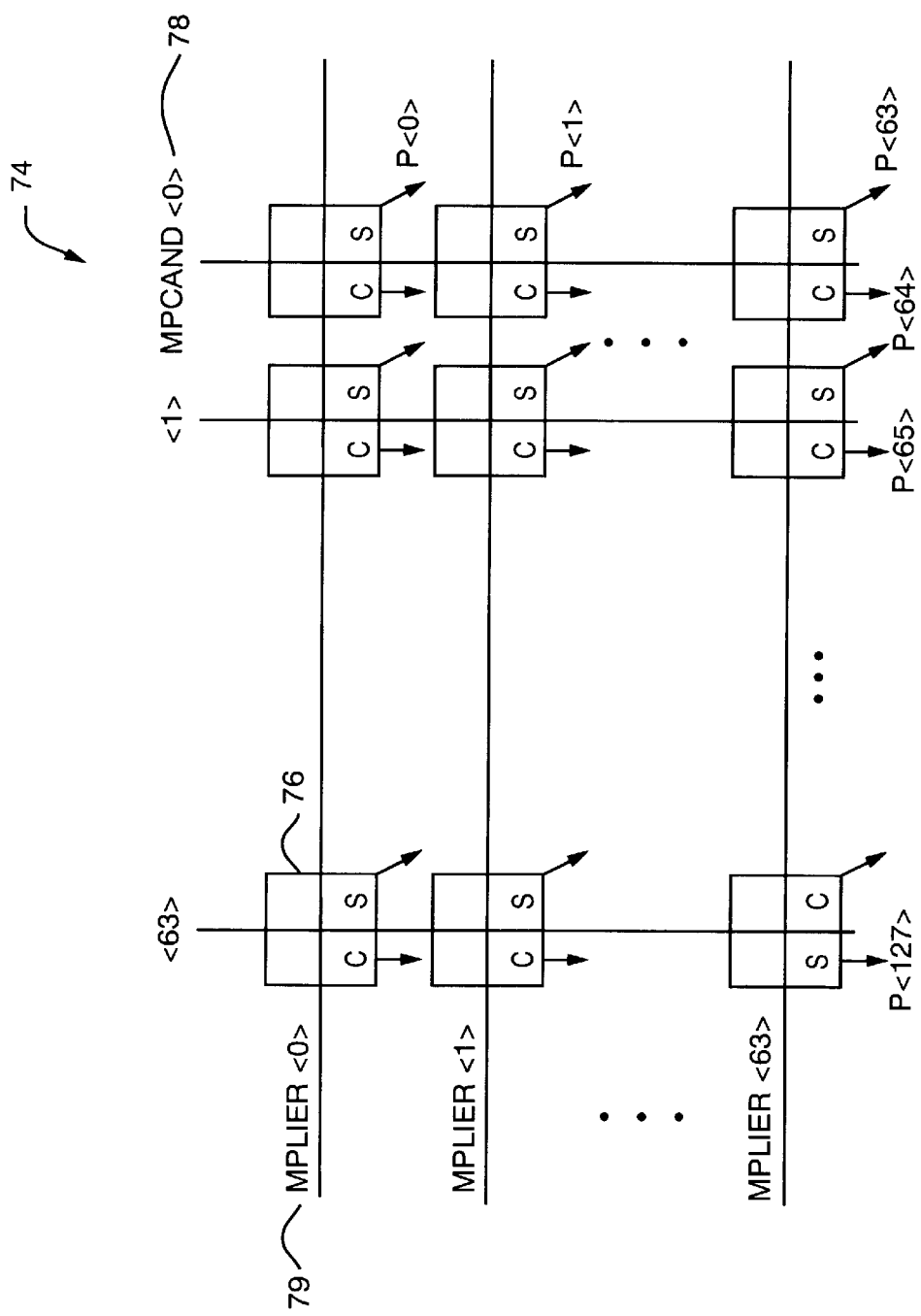
FIG. 4 is a schematic diagram of a classical array multiplier disclosed in the prior art.
Figure 13:
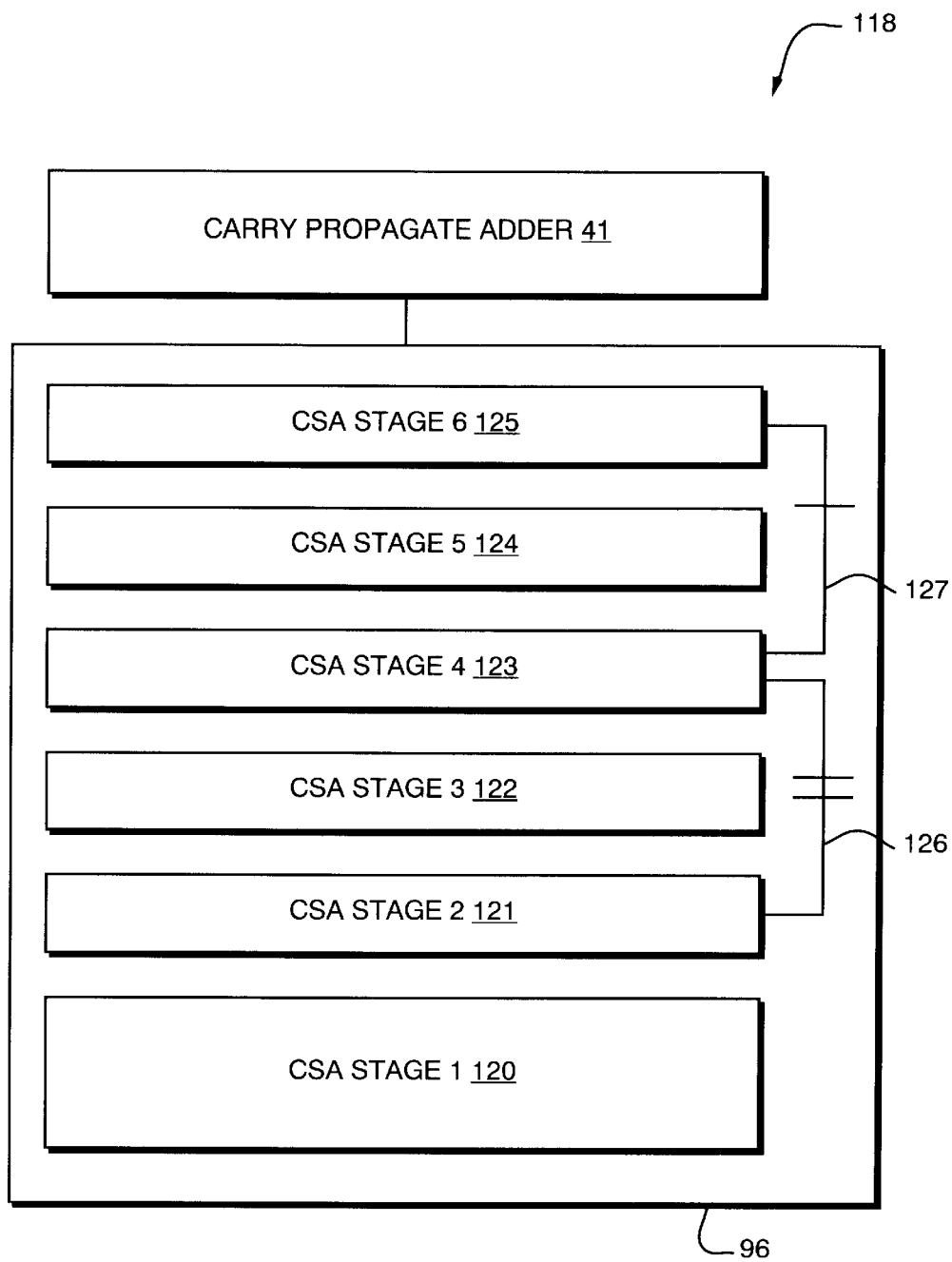
FIG. 13 is a schematic diagram of a processor electrically connected to an adder wherein the processor includes six stages of carry save adders.

Shown in FIG. 13, the compressor 96 is a Wallace tree compressor that includes six stages of CSA adders. The various stages in the compressor 96 are comparable to the levels shown in FIG. 1 of the Wallace tree. Specifically, the various stages represent varying numbers of carry save adders located on each stage of the compressor 96.

In one embodiment of the invention, CSA stage one 120 of the compressor 96 contains six rows of 3:2 carry save adders, and each row is 64 CSA's wide. CSA stage one 120 reduces the eighteen inputs to a total of twelve outputs which are received by stage two 121. Stage two 121 of the compressor 96 contains four rows of carry save adders and reduces the number of inputs to eight outputs which are received by stage three 122. However, stage three 122 of the compressor 96 only contains two rows of carry save adders. Therefore, stage three 122 can only process six of the eight outputs from stage two 121. Thus, the two outputs 126 from stage two 121 are forwarded to stage four 123 as inputs for further processing. Accordingly, the six inputs to stage three 122 are reduced to four outputs and the four outputs are forwarded to stage four 123.

Stage four 123 of the compressor 96 contains two rows of carry save adders. Stage four 123 receives six inputs, two from stage two 121 and four from stage three 122. Stage four 123 reduces the six inputs to four outputs. Stage five 124 of the compressor 96 contains one row of carry save adders and receives the outputs from stage four 123. However, stage five 124 is only able to process three inputs. As a result, another overflow occurs. Accordingly, one of the outputs 127 from stage four 123 is forwarded to stage six 125 for further processing, and three of the four outputs from stage four 123 are processed by the CSA's on stage five 124. Stage five 124 reduces the three inputs to two outputs and forwards the two outputs to stage six 125. Stage six 125 of the compressor 96 contains a single row of carry save adders. Stage six 125 receives a total of three inputs. The two outputs from stage five 124, and an overflow output from stage four 123. Stage six 125 reduces the three inputs to two outputs. The two outputs from stage six 125 represent a sum and carry.

Therefore, in an embodiment of the invention, after traversing the six stages of carry save adders in the compressor 96, eighteen partial products are reduced to two numbers that are added using a carry propagate adder 41 to obtain the final product.

In one embodiment, the partial product generator 112 and the CSA stages in the compressor 96 are separated. In the hardware, these components are interleaved to reduce the number of vertical wiring tracks. Even with interleaving the CSA compressors in the logic of the partial product generator 112, thirteen vertical wiring tracks per bit are necessary. To accommodate the necessary wiring tracks, both the partial product generator array 112 and CSA stages one and two use complementary logic, eliminating differential signals. CSA stages one and two are laid out using a 14×16 $\mu m^2$ cell at the expense of speed. A small cell is significant because stages one and two make up 60% of the CSA cells. The speed lost in the first two stages is compensated for in the final four stages using a combination of differential cascode and dynamic logic.

Variations, modifications, and other implementations of what is described herein will occur to those of ordinary skill in the art without departing from the spirit and the scope of the invention as claimed. Accordingly, the invention is to be defined not by the preceding illustrative description but instead by the spirit and scope of the following claims.

What is claimed is:

1. A processor that comprises:
   a multiplier capable of producing an M×N array of partial product bits of an M bit multiplier and an N bit multiplicand, said multiplier comprising an array of AND gates, each of which receives as inputs a multiplier bit and a multiplicand bit and whose output is a partial product bit;

means for arranging said M×N array of partial products bits by shifting, in the direction of increasing bit order of multiplicand, each successive row of partial product bits by the number of bits corresponding to the bit order of the multiplier bit that produced said row, thereby resulting in a parallelogram of shifted partial product bits;

means for forming an M×2M rectangle of shifted partial products that shares its diagonal with the longer diagonal of said parallelogram, by completing with zeros the area outside said parallelogram but inside said rectangle;

a Wallace compressor comprising a rectangular compressor array of 3:2 carry save adders, the compressor array having M columns and ½ M rows, and generating a set of sum bits and a set of carry bits as the compressor output, each of the carry save adders receiving as data inputs one of the partial product bits of a quadrant of said rectangle, a sum bit and a carry bit and producing a sum bit and a carry bit as its outputs; and a first adder for summing said set of sum bits and said set of carry bits of said compressor output.

2. The processor of claim 1 further comprising:
   means, responsive to control signals, for effecting multiple passes by applying to the compressor as data inputs, the lowest order sub-array of partial product bits of said rectangle in a first pass, the next-to-lowest order sub-array of partial product bits of said rectangle in a second pass, the next-to-highest order sub-array of partial product bits of said rectangle in a third pass, the highest order sub-array of partial product bits of said rectangle in a fourth pass.

3. The processor of claim 1 further comprising:
   means, in response to a first control signal, for setting the carry input bits in the right-most compressor column to zero, setting the sum and carry input bits in the top-most compressor row to zero, and applying as data inputs the sub-array of the lowest order partial product bits of said rectangle; and means for applying the compressor output to said first adder thereby generating the product of said multiplier and said multiplicand.

4. The processor of claim 1 further comprising:

means for performing, in response to a second control signal, a first pass in which the carry input bits in the right-most compressor column are set to zero, the sum and carry input bits in the top-most compressor row are set to zero, and the data inputs are the sub-array of the lowest order partial product bits of said rectangle;

means for performing a second pass through said compressor by applying to said top-most compressor row the compressor output of the first pass, setting the carry bits in the right-most compressor column to zero, and applying as data inputs the sub-array of the next-to-lowest order partial product bits of said rectangle; and means for applying the compressor output from the second pass to said first adder thereby generating the product of said multiplier and said multiplicand.

5. The processor of claim 1 further comprises:

means for performing, in response to a third control, a first pass in which the carry in-put bits in the right-most compressor column are set to zero, the sum and carry input bits in the top-most compressor row are set to zero, the data inputs are the sub-array of the lowest order partial product bits of said rectangle, and the carry bits produced in the left-most compressor column are saved in memory for use in later passes;

means for performing a second pass through said compressor, by applying to said top-most compressor row the compressor output of the first pass, setting the carry bits in the right-most compressor column to zero, applying as data inputs the sub-array of the next-to-lowest order partial product bits of said rectangle, and storing the carry bits produced in the left-most compressor column in memory for use in the fourth pass;

means for applying the compressor output of the second pass to said first adder thereby generating the lower order product bits of said multiplier and said multiplicand;

means for performing a third pass through said compressor, by setting said top-most compressor row to zero, applying to the carry bits in the right-most compressor column the carry bits produced in the left-most column during the first pass, and applying as data inputs the sub-array of the next-to-highest order partial product bits of said rectangle;

means for performing a fourth pass through said compressor, by applying to said top-most compressor row the compressor output of the third pass, applying to the carry bits in the right-most compressor column the carry bits produced in the left-most column during the second pass, and applying as data inputs the sub-array of the highest order partial product bits of said rectangle; and means for applying the compressor output of the fourth pass to said first adder thereby generating the lower order product bits of said multiplier and said multiplicand.

6. A method for multiplying comprising the steps of:

producing an M×M array of partial product bits of an M bit multiplier and an N bit multiplicand by generating outputs from an array of AND gates, each of which receives as inputs a multiplier bit and a multiplicand bit and whose output is a partial product bit;

arranging said M×N array of partial products bits by shifting, in the direction of increasing bit order of multiplicand, each successive row of partial product bits by the number of bits corresponding to the bit order of the multiplier bit that produced said row, thereby resulting in a parallelogram of shifted partial product bits;

forming an M×2M rectangle of shifted partial products that shares its diagonal with the longer diagonal of said parallelogram, by completing with zeros the area outside said parallelogram but inside said rectangle; and generating a set of sum bits and a set of carry bits as the output of a Wallace compressor comprising a rectangular array having M columns and ½ M rows of 3:2 carry save adders, each of the carry save adders receiving as inputs one of the partial product bits of a quadrant of said rectangle, a sum bit and a carry bit and producing a sum bit and a carry bit as its outputs.

7. The method of claim 6 comprising the further step of:

summing said set of sum bits and said set of carry bits of said compressor output with a first adder or a second adder.

8. The method for multiplying in claim 6, which further comprises the steps of:

receiving as data inputs to the carry save adders of said compressor the sub-array of the lowest order partial product bits of said rectangle in a first pass of the compressor;

receiving as data inputs to the carry save adders of compressor the sub-array of the next-to-lowest order partial product bits of said rectangle in a second pass of the compressor;

receiving as data inputs to the carry save adders of compressor the sub-array of the next-to-highest order partial product bits of said rectangle in a third pass of the compressor;

receiving as data inputs to the carry save adders of compressor the sub-array of the highest order partial product bits of said rectangle in a fourth pass of the compressor;

receiving sum and carry input bits at the top-most compressor row;

receiving carry inputs bits at the right-most compressor column;

producing a set of carry output bits at the left-most compressor column; and producing as a compressor output said set of carry and sum bits at the bottom-most compressor row.

9. The method of claim 6, which further comprises the steps of:

in response to a first control signal, setting the carry input bits in the right-most compressor column to zero, setting the sum and carry input bits in the top-most compressor row to zero, and applying as data inputs the sub-array of the lowest order partial product bits of said rectangle; and summing the compressor output thereby generating the product of said multiplier and said multiplicand.

10. The method of claim 6, which further comprises the steps of:

performing, in response to a second control signal, a first pass in which the carry in-put bits in the right-most compressor column are set to zero, the sum and carry input bits in the top-most compressor row are set to zero, and the data inputs are the sub-array of the lowest order partial product bits of said rectangle;

performing a second pass through said compressor by applying to said top-most compressor row the compressor output of the first pass, setting the carry bits in the right-most compressor column to zero, and applying as data inputs the sub-array of the next-to-lowest order partial product bits of said rectangle; and summing the compressor output from the second pass thereby generating the product of said multiplier and said multiplicand.

11. The method of claim 7, which further comprises the steps of:

performing, in response to a third control, a first pass in which the carry input bits in the right-most compressor column are set to zero, the sum and carry input bits in the top-most compressor row are set to zero, the data inputs are the sub-array of the lowest order partial product bits of said rectangle, and the carry bits produced in the left-most compressor column are saved in memory for use in later passes;

performing a second pass through said compressor, by applying to said top-most compressor row the compressor output of the first pass, setting the carry bits in the right-most compressor column to zero, applying as data inputs the sub-array of the next-to-lowest order partial product bits of said rectangle, and storing the carry bits produced in the left-most compressor column in memory for use in the fourth pass;

applying the compressor output of the second pass to said first adder thereby generating the lower order product bits of said multiplier and said multiplicand;

performing a third pass through said compressor, by setting said top-most compressor row to zero, applying to the carry bits in the right-most compressor column the carry bits produced in the left-most column during the first pass, and applying as data inputs the sub-array of the next-to-highest order partial product bits of said rectangle;

performing a fourth pass through said compressor, by applying to said top-most compressor row the compressor output of the third pass, applying to the carry bits in the right-most compressor column the carry bits produced in the left-most column during the second pass, and applying as data inputs the sub-array of the highest order partial product bits of said rectangle; and applying the compressor output of the fourth pass to said second adder thereby generating the higher order product bits of said multiplier and said multiplicand.

* * * * *